(12) United States Patent
Sakamoto et al.

(10) Patent No.: US 7,061,564 B2
(45) Date of Patent: Jun. 13, 2006

(54) LIQUID CRYSTAL DEVICE, METHOD FOR PRODUCING THE LIQUID CRYSTAL DEVICE, AND ELECTRONIC APPARATUS

(75) Inventors: Kazunari Sakamoto, Chino (JP); Masayuki Yazaki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/859,993

(22) Filed: Jun. 4, 2004

(65) Prior Publication Data

US 2005/0007528 A1    Jan. 13, 2005

(30) Foreign Application Priority Data

Jul. 4, 2003    (JP)  ............................. 2003-192291
Jul. 4, 2003    (JP)  ............................. 2003-192293

(51) Int. Cl.
*G02F 1/1337* (2006.01)

(52) U.S. Cl. ...................................... 349/129
(58) Field of Classification Search ................ 349/129
See application file for complete search history.

(56) References Cited

U.S. PATENT DOCUMENTS 6,762,809 B1   7/2004 Murade
2005/0200783 A1*  9/2005 Tsuboi et al. ............... 349/129

FOREIGN PATENT DOCUMENTS

| JP | A 2000-10119 | 1/2000 |
|---|---|---|
| JP | A 2001-142089 | 5/2001 |
| KR | 2001-67273 | 7/2001 |
| KR | 2003-33833 | 5/2003 |

* cited by examiner

*Primary Examiner*—James A. Dudek
(74) *Attorney, Agent, or Firm*—Oliff & Berridge, PLC

(57) ABSTRACT

The invention provides a liquid crystal device including a first substrate and a second substrate opposing each other, a plurality of pixel electrodes disposed on the first substrate in a matrix, drive voltages having opposite polarities with respect to a reference voltage being applied to adjacent pixels, a common electrode disposed on the second substrate, and an electro-optical substance disposed between the first substrate and the second substrate. The device can also include a second alignment layer disposed on the second substrate and subjected to a uniform alignment operation, a first alignment layer formed of an alignment material on the first substrate subjected to alignment operations so that the alignment operation at strip areas and the alignment operation at areas other than the strip areas are different. Each strip area can be disposed near a first edge of its corresponding pixel electrode and is an area where the electro-optical substance is affected by an electric field produced between the adjacent pixel electrodes by the drive voltages having opposite polarities. By this, the aperture ratio can be increased by reducing reverse tilts caused by the effects of the transverse electric field.

5 Claims, 10 Drawing Sheets

LIQUID CRYSTAL DEVICE, METHOD FOR PRODUCING THE LIQUID CRYSTAL DEVICE, AND ELECTRONIC APPARATUS

BACKGROUND OF THE INVENTION

1. Field of Invention

The present invention relates to a liquid crystal device whose aperture ratio is increased, a method for producing the liquid crystal device, and an electronic apparatus.

2. Description of Related Art

A liquid crystal device can include two substrates, such as a glass substrate and a quartz substrate, and liquid crystals sealed in the space between the two substrates. In the liquid crystal device, active elements, such as thin-film transistors (TFTs), are disposed in a matrix on one of the substrates, and an opposing electrode is disposed on the other substrate. By varying optical characteristics of the liquid crystal layer between both substrates in accordance with an image signal, an image can be displayed.

More specifically, a voltage can be applied to the liquid crystal layer between pixel electrodes (ITOs) and the opposing electrode based on an image signal supplied to the pixel electrodes disposed in a matrix by the TFT elements in order to change the arrangement of liquid crystal molecules. This changes the transmittance ratio of pixels. As a result, light transmitted through the pixel electrodes and the liquid crystal layer can be varied in accordance with the image signal in order to display an image.

In order to define the arrangement of the liquid crystal molecules when voltage is not applied, an alignment layer on the surface of one of the substrates (the active matrix substrate or element substrate) contacting the liquid crystal layer and an alignment layer on the surface of the other substrate (opposing substrate) contacting the liquid crystal layer is rubbed, so that, when a voltage is not applied, the liquid crystal molecules align in the rubbing direction. For example, when the alignment layers on the element substrate and the opposing substrate are rubbed at twist angles that differ by 90 degrees from each other, the liquid crystal molecules continuously change their orientation in a liquid crystal panel, so that they are aligned in such a manner that their orientations at the substrates differ by 90 degrees from each other.

Polarizers are disposed on the front and back surfaces of the liquid crystal panel in order to transmit only a predetermined polarized component of incident light. In a normally white mode, the polarization axes of the polarizers on the front and back surfaces of the liquid crystal panel can be set at angles that are different by 90 degrees from each other in order to match the respective rubbing directions at the substrates. This causes light incident upon the liquid crystal panel through the polarizer on the back surface of the liquid crystal panel to rotate 90 degrees in accordance with the orientation of the liquid crystal molecules in the liquid crystal layer and exit from the front surface of the liquid crystal panel through the polarizer on the front surface of the liquid crystal panel when a voltage is not applied, so that a bright display is produced.

When a voltage is applied, the alignment direction of the liquid crystals change, that is, the long axes of the liquid crystal molecules are tilted in accordance with the voltage. As a result, the rotation of the light in the vibration direction caused by the liquid crystals in the liquid crystal panel is restricted. Therefore, the light exiting from the front surface of the liquid crystal panel is absorbed by the polarizer on the front surface of the liquid crystal panel. Consequently, an image is displayed by applying a voltage in accordance with an image signal to the liquid crystals and transmitting light with a transmittance ratio in accordance with the image signal.

As described above, the arrangement of the liquid crystal molecules when a voltage is not applied is determined by the rubbing of the alignment layers. The alignment layers are formed by applying, for example, polyimide to a thickness of approximately a few tens of nanometers. By forming the alignment layers on the surfaces of both substrates opposing the liquid crystal layer, the liquid crystal molecules can be aligned along the surfaces of the substrates. The rubbing is performed to form small grooves in the surfaces of the alignment layers to make the alignment layers anisotropic. By rubbing the alignment layers in a certain direction, the arrangements of the liquid crystal molecules are determined.

In order for the inclination angle changing directions of all of the liquid crystal molecules to be the same when a voltage is applied, the long axes of the liquid crystal molecules are tilted by predetermined angles (pretilt angles) with respect to the substrates and aligned when a voltage is not applied.

In the liquid crystal device, application of a DC voltage to the liquid crystals causes deterioration of the liquid crystals by, for example, decomposition of liquid crystal components, contamination due to impurities produced in a liquid crystal cell, or image sticking. To overcome such a problem, in general, reverse driving is carried out to reverse the drive voltage polarities of the pixel electrodes in a certain period corresponding to, for example, one image signal field or one image signal frame.

When the drive voltage polarity of every pixel electrode forming an image display area is merely reversed at a certain period (that is, when what is called a video reverse driving method is carried out), flickering or crosstalk occurs at a certain period particularly when the number of pixels is large. To prevent flickering or crosstalk at a certain period, line reverse driving methods, such as a 1H reverse driving method or an 1S reverse driving method, have been developed. The 1H reverse driving method is carried out to reverse the drive voltage polarity with every row of pixel electrodes at a certain period, and the 1S reverse driving method is carried out to reverse the drive voltage polarity with every column of pixel electrodes at a certain period.

However, when a line reverse driving method is carried out, an electric field (transverse electric field) can be generated between adjacent pixel electrodes on the same substrate in the row direction or column direction in which voltages of different polarities are applied.

FIG. 12 is a schematic view illustrating the effects of transverse electric field and pretilting of liquid crystal molecules when a voltage is not applied.

As mentioned above, the liquid crystal molecules are disposed at predetermined pretilt angles. As shown by the + and − signs in FIG. 12, drive voltages of opposite polarities with respect to a reference voltage are applied to adjacent pixel electrodes 121. This causes a transverse electric field 123 shown by broken lines in FIG. 12 to be generated between the adjacent pixel electrodes 121. When such an electric field 123 is generated between the adjacent pixels, a difference occurs between the tilting direction of liquid crystal molecules at one edge of each pixel electrode 121 and the electric field direction. Therefore, the transverse electric field 123 produces an area in which the tilting direction of a liquid crystal molecule 124 at one edge of each pixel electrode 121 is different from the tilting directions of other liquid crystal molecules 122.

In areas in which the tilt angle changing directions of liquid crystal molecules are different from those disposed towards the center of the pixel electrodes 121 due to the effects of such a transverse electric field (such areas are hereinafter referred to as reverse tilt areas), the polarization of transmission light is the same as that in normal tilt areas. However, a light streak appears due to light scattering at boundary lines (disclination lines) between the normal tilt areas and the reverse tilt areas.

To overcome such a problem, the reverse tilt areas disposed outwardly of the disclination lines are set at non-open areas by a light-shielding film formed on the opposing substrate. This prevents an image to be displayed at a portion where image quality is reduced by light scattering. However, this reduces aperture ratio.

To overcome such a problem, JP2001-142089A, for example, discloses a technology for narrowing the reverse tilt areas produced by transverse electric field as a result of reducing the effects of the transverse electric field by increasing vertical electrical field at the pixel electrode edges. The vertical electric field is increased by making gaps at the pixel electrode edges narrower than the central portions of the pixel electrodes by bulging the pixel electrode edges. Narrowing the reverse tilt areas narrows the light-shielding film, so that aperture ratio is increased. However, in this technology, the pixel electrode edges may not be properly rubbed due to the bulges of the pixel electrode edges. When they are not properly rubbed, these bulges are obstacles to the rubbing, thereby reducing image quality.

SUMMARY OF THE INVENTION

The invention provides a liquid crystal device, a method for producing the liquid crystal device, and an electronic apparatus. In the liquid crystal device, the aperture ratio can be increased by narrowing reverse tilt areas by controlling pretilt angles of liquid crystal molecules at locations corresponding to pixel electrode edges affected by transverse electric field even when a surface of a liquid crystal substrate is planarized.

According to one aspect of the invention, there can be provided a liquid crystal device having a first substrate and a second substrate opposing each other, a plurality of pixel electrodes disposed on the first substrate in a matrix, drive voltages having opposite polarities with respect to a reference voltage being applied to adjacent pixels; a common electrode disposed on the second substrate, an electro-optical substance disposed between the first substrate and the second substrate, a second alignment layer disposed on the second substrate and subjected to a uniform alignment operation, a first alignment layer formed of an alignment material on the first substrate subjected to alignment operations so that the alignment operation at strip areas and the alignment operation at areas other than the strip areas are different. Each strip area is disposed near a first edge of its corresponding pixel electrode and is an area where the electro-optical substance is affected by an electric field produced between the adjacent pixel electrodes by the drive voltages having opposite polarities.

In this structure, when drive voltages having opposite polarities with respect to a reference voltage are applied to adjacent pixel electrodes, transverse electric field is generated between the adjacent pixel electrodes. By the transverse electric field, reverse tilting tends to occur near the first edge of each pixel electrode. An alignment operation that is different from the alignment operation performed at the other areas is performed at the strip areas near the respective first edges of the pixel electrodes that are affected by the transverse electric field, so that the first alignment layer is formed. Therefore, the alignment operation which makes it difficult for reverse tilting to occur at the strip areas is performed at the strip areas. This makes it possible to reduce the actual reverse tilt range. Consequently, the light-shielding film for preventing a reduction in image quality caused by the reverse tilting can be narrowed, thereby increasing the aperture ratio.

In the liquid crystal device, the first alignment layer may be subjected to an alignment operation so that the pretilt angles in the strip areas are greater than the pretilt angles in the other areas. By virtue of this structure, the pretilt angles in the strip areas can be greater than the pretilt angles in the other areas, so that reverse tilting occurs less frequently in the strip areas than in the other areas. Therefore, the actual reverse tilt range is narrowed, so that aperture ratio is increased.

The alignment operation at the strip areas may be carried out so that the pretilt angles in the strip areas do not allow reverse tilting to occur in open areas. By virtue of this structure, the pretilt angles in the strip areas are sufficiently large, so that the actual areas in which reverse tilting occurs are sufficiently narrowed.

The pixel electrodes may be planarized. By virtue of this structure, the areas in which reverse tilting tends to occur due to planarization are narrowed by controlling the pretilt angles, so that the problem of misalignment by the planarization is mitigated, thereby increasing aperture ratio.

At the first edge of each pixel electrode near which its corresponding strip area is disposed, the angle between the pretilt direction of the electro-optical substance and the direction of the transverse electric field may be greatest. By virtue of this structure, it is possible to narrow the range in which reverse tilting occurs most frequently at the first edge of each pixel electrode that has the greatest angle difference between the pretilt direction and the transverse electric field direction. Therefore, aperture ratio is increased.

According to another aspect of the invention, there is provided a method for producing a liquid crystal device having the steps of forming an alignment material on a plurality of pixel electrodes disposed on the first substrate in a matrix, drive voltages having opposite polarities with respect to a reference voltage being applied to adjacent pixels, forming a second alignment layer subjected to an alignment operation on a common electrode on a second substrate opposing a first substrate, and forming a first alignment layer formed by performing alignment operations on the alignment material so that the alignment operation at strip areas is different from the alignment operation at areas other than the strip areas in order that the pretilt angles in the strip areas are greater than the pretilt angles in the other areas. Each strip area is disposed near one edge of its corresponding pixel electrode and is an area where an electro-optical substance is affected by an electric field produced between the adjacent pixel electrodes by the drive voltages having opposite polarities.

By virtue of this structure, the second alignment layer can be formed on the common electrode, and the alignment material is disposed on the pixel electrodes. The alignment material is such that the alignment operation performed at the strip areas near the respective first edges of the pixel electrodes is different from that performed at the other areas. This causes the first alignment layer in which the pretilt angles in the strip areas are greater than those in the other areas to be formed. The pretilt angles in the strip areas are greater than those in the other areas, so that reverse tilting occurs less frequently. Consequently, the aperture ratio is increased by narrowing the actual reverse tilt range.

The step of forming the first alignment layer may include performing a plurality of the alignment operations at each strip area and at each other area in order that the pretilt angles in the strip areas are greater than the pretilt angles in the other areas. By virtue of this structure, the pretilt angles in the strip areas are greater than the pretilt angles in the other areas as a result of performing the plurality of alignment operations at each strip area and at each other area.

The step of forming the first alignment layer may include a first substep of subjecting the entire alignment material to a uniform alignment operation and a second substep of performing an alignment operation at the strip areas or the other areas. By virtue of this structure, the entire alignment material is subjected to a uniform alignment operation by the first substep. In addition, an alignment operation is performed at the strip areas or the other areas on the alignment material by the second substep. Therefore, the alignment operation performed at the strip areas and that performed at the other areas are different from each other, so that the pretilt angles in the strip areas are greater than those in the other areas.

The step of forming the first alignment layer may include a first substep of performing an alignment operation at the strip areas or the other areas on the alignment material and a second substep of performing an alignment operation that is different from that of the first substep at the strip areas or the other areas at which the alignment operation of the first substep is not performed. By virtue of this structure, in the first substep, an alignment operation is performed at the strip areas or the other areas on the alignment material. In addition, in the second substep, an alignment operation that is different from the alignment operation in the first step is performed at the strip areas or the other areas at which the alignment operation in the first step is not performed. Therefore, the alignment operation performed at the strip areas and that performed at the other areas are different from each other, so that the pretilt angles in the strip areas are greater than the pretilt angles in the other areas.

The step of forming the first alignment layer may include a combination of at least two of rubbing, ion beam processing, and oblique deposition performed so that the pretilt angles in the strip areas are greater than the pretilt angles in the other areas. By virtue of this structure, rubbing, ion beam processing, and oblique deposition can control the pretilt angles. Therefore, combining two or more of these operations makes it possible for the pretilt angles in the strip areas to be greater than those in the other areas.

An electronic apparatus of the invention can include any one of the above-described liquid crystal devices or a liquid crystal device produced by any one of the above-described methods. By virtue of this structure, the actual reverse tilt areas are narrowed, so that the aperture ratio is increased. As a result, an image of high quality can be displayed.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
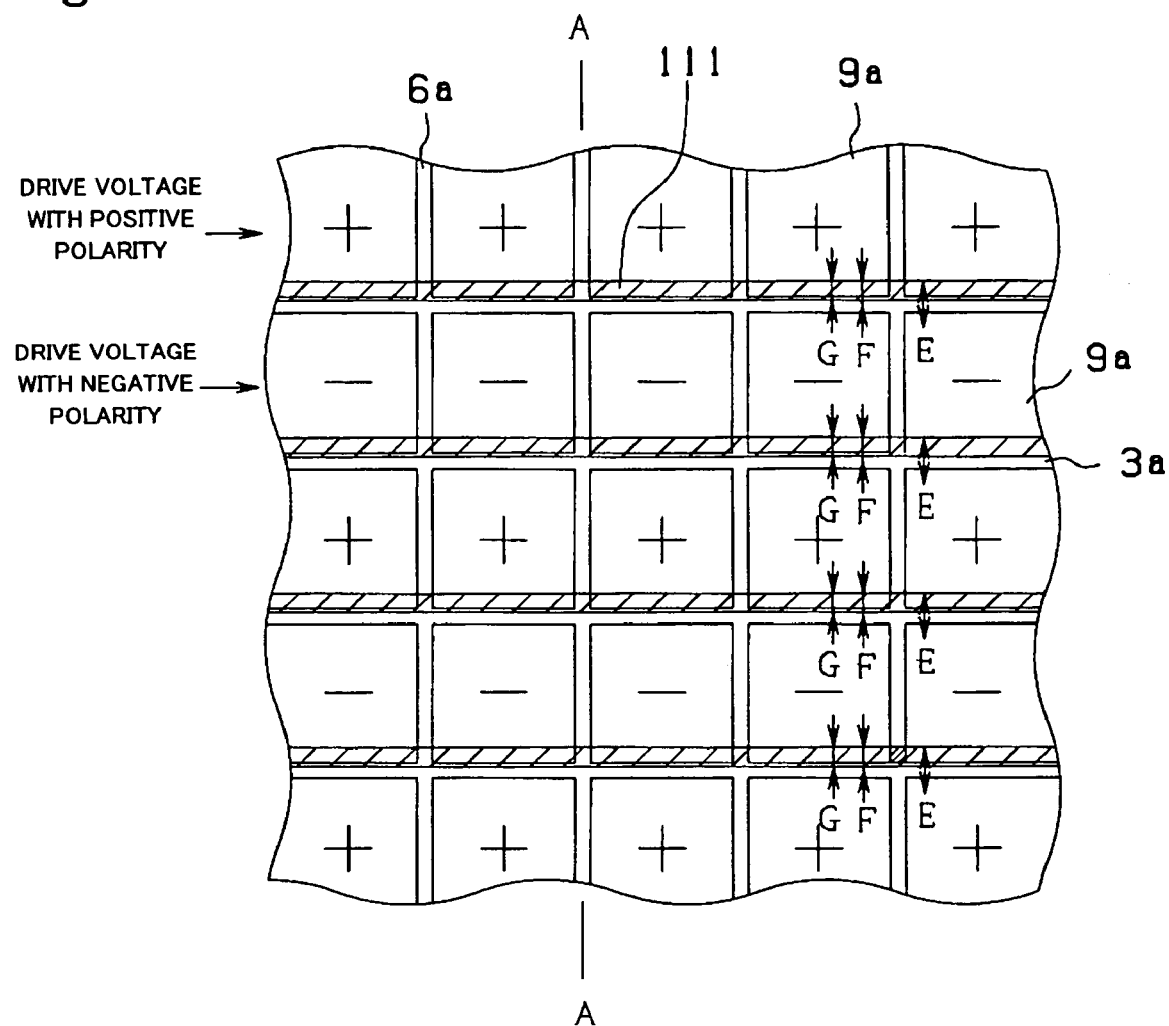
FIG. 1 is a schematic plan view of a liquid crystal device of an embodiment of the present invention.
Figure 2:
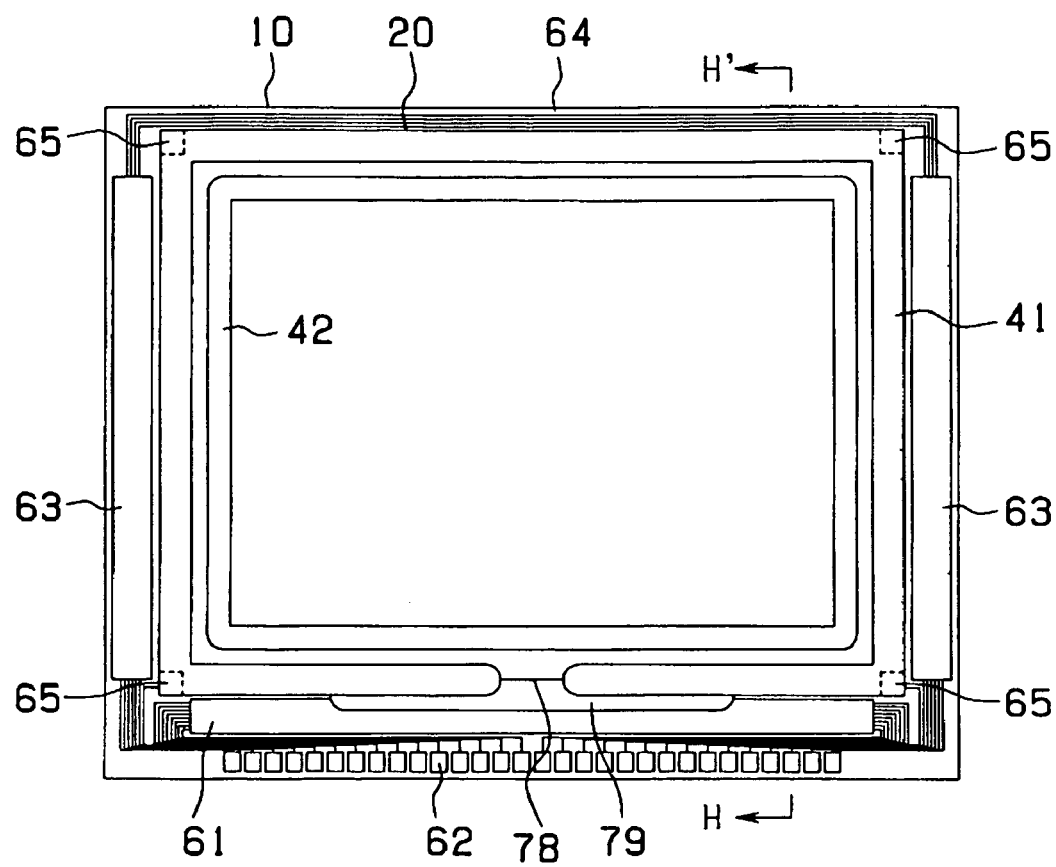
FIG. 2 is a plan view of the liquid crystal device of the embodiment and components on the liquid crystal device as seen from an opposing substrate.

Hereunder, an embodiment of the invention will be described in detail with reference to the relevant drawings. FIG. 1 is a schematic plan view of a liquid crystal device of an embodiment of the invention. In the embodiment, a liquid crystal device using a TFT substrate is used. FIG. 2 is a plan view of the liquid crystal device of the embodiment and components on the liquid crystal device as seen from an opposing substrate.

Figure 3:
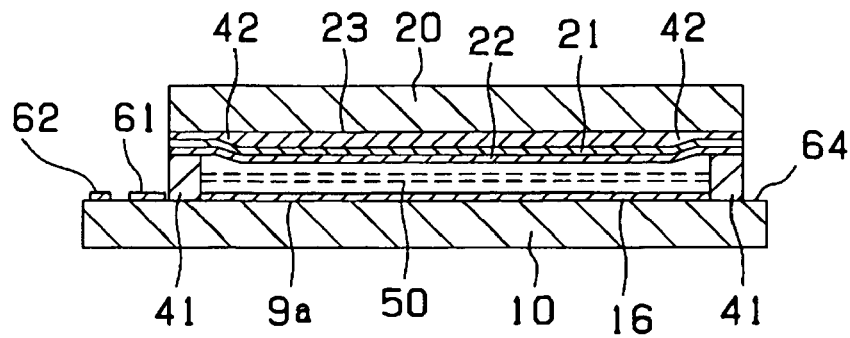
FIG. 3 is a sectional view taken along line H–H' of FIG. 2 of the liquid crystal device after an assembly process of affixing a TFT substrate, which is an active matrix substrate, and the opposing substrate to each other and filling the space between the substrates with liquid crystals.
Figure 4:
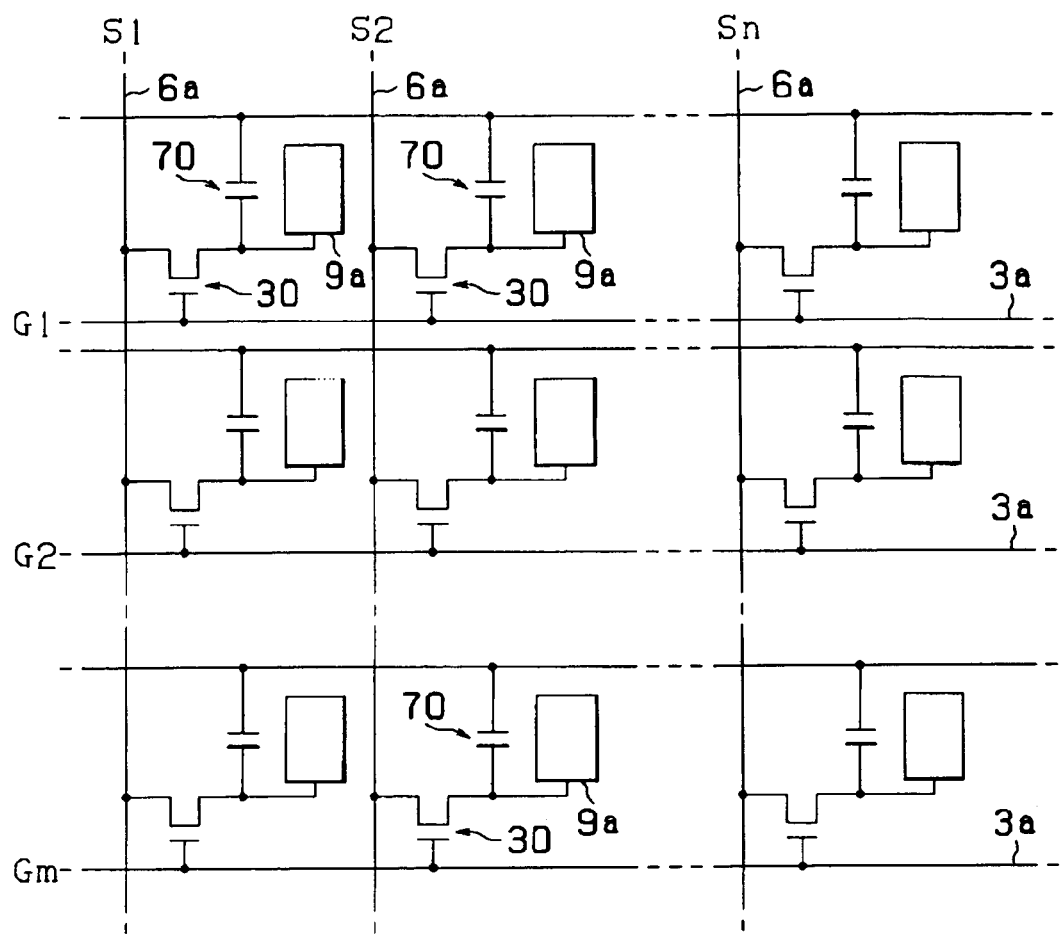
FIG. 4 shows an equivalent circuit comprising, for example, various elements and wires at pixels of a pixel area of the liquid crystal device of the embodiment.
Figure 5:
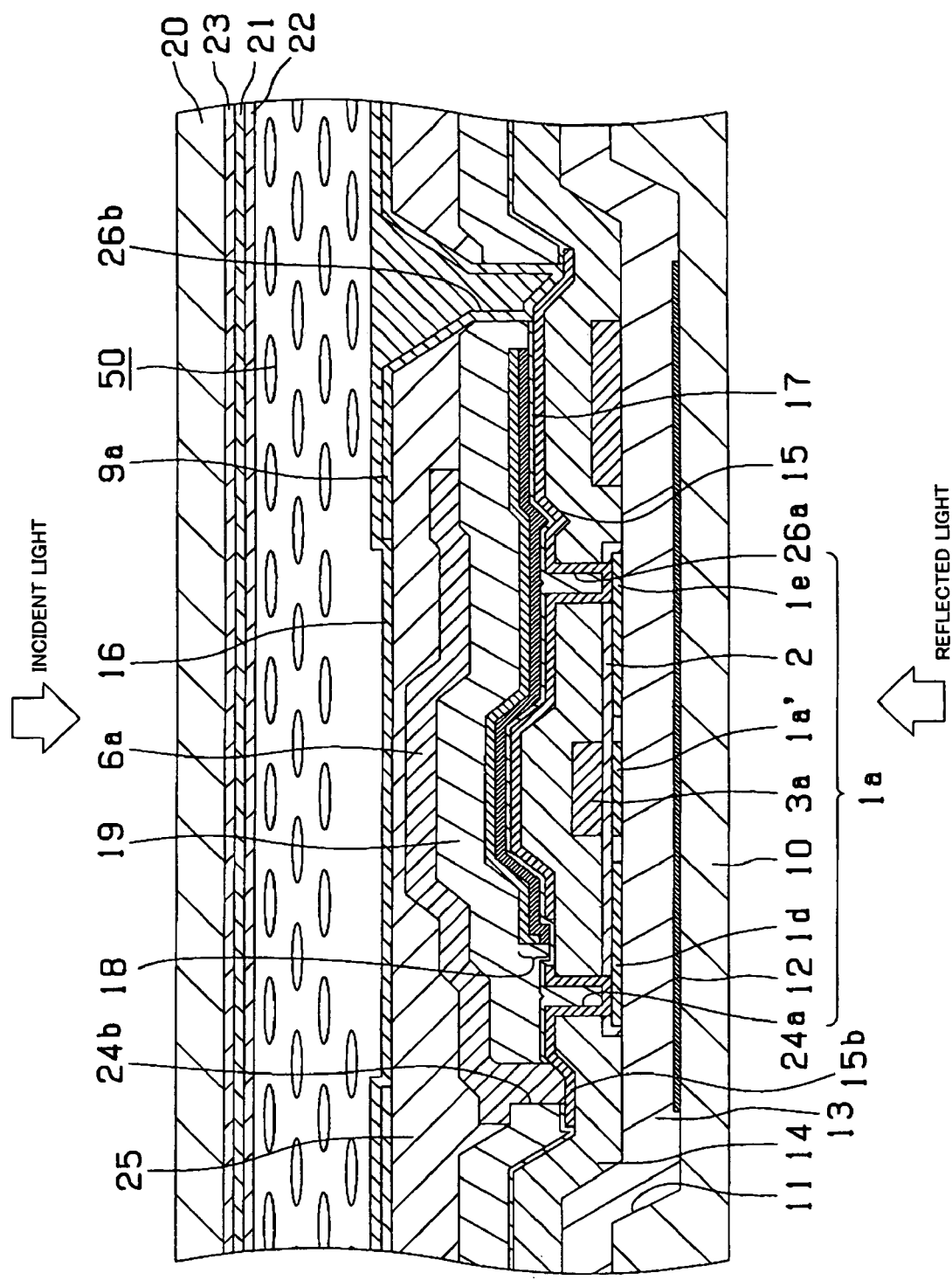
FIG. 5 is a sectional view showing in detail a pixel structure of the liquid crystal device shown in FIGS. 1 to 4.
Figure 6:
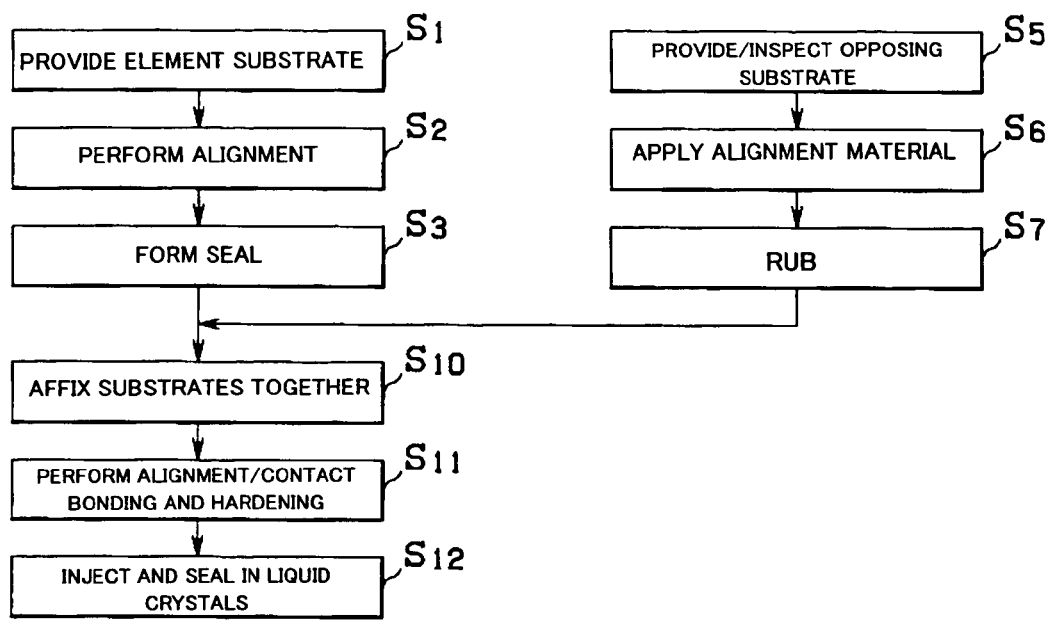
FIG. 6 is a flowchart of the steps of assembling the liquid crystal device.
Figure 7:
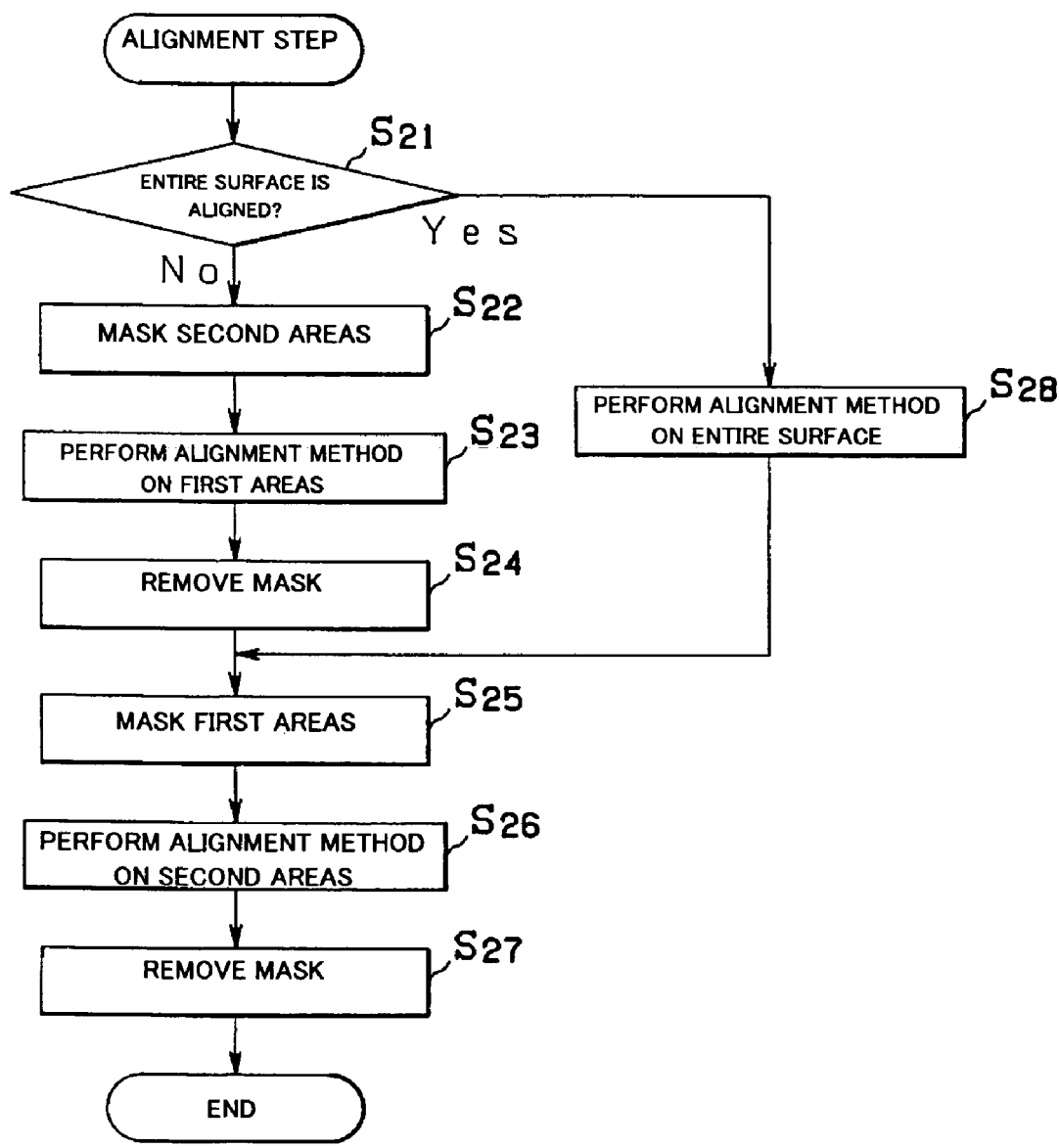
FIG. 7 is a flowchart of the steps of an alignment operation in the embodiment.
Figure 8:
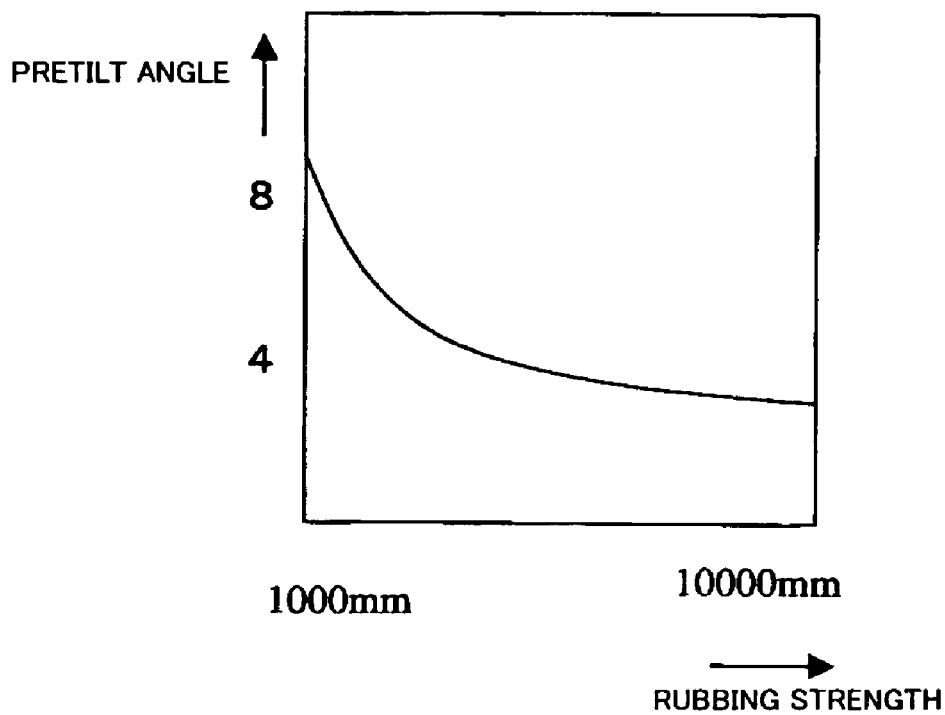
FIG. 8 is a graph showing the relationship between rubbing and pretilting.
Figure 9:
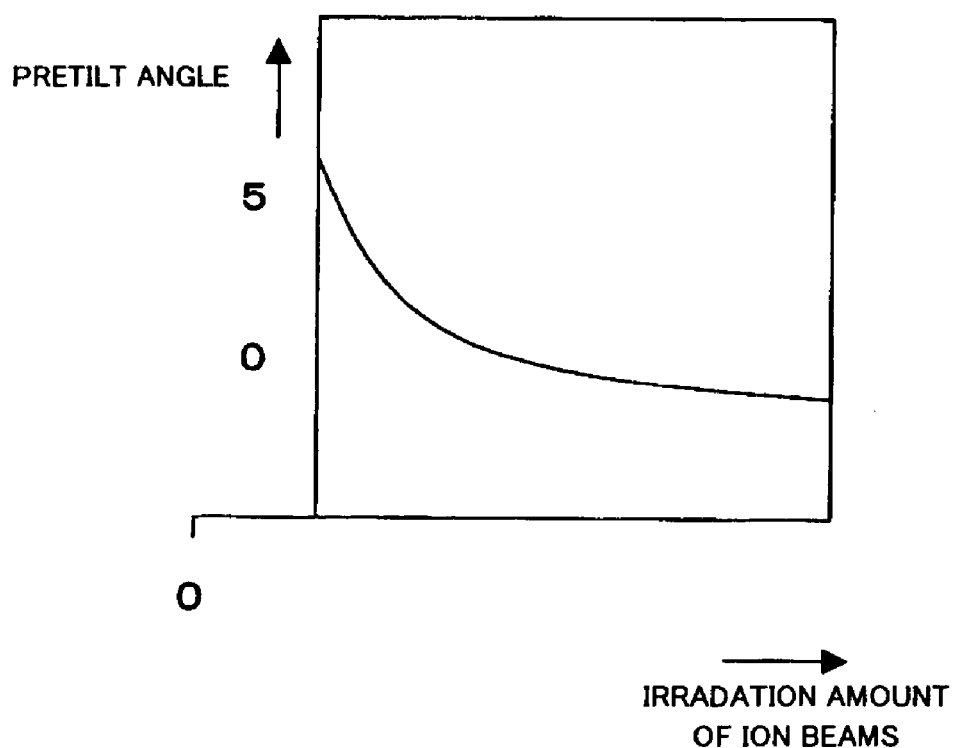
FIG. 9 is a graph showing the relationship between ion beam irradiation and pretilting.
Figure 10:
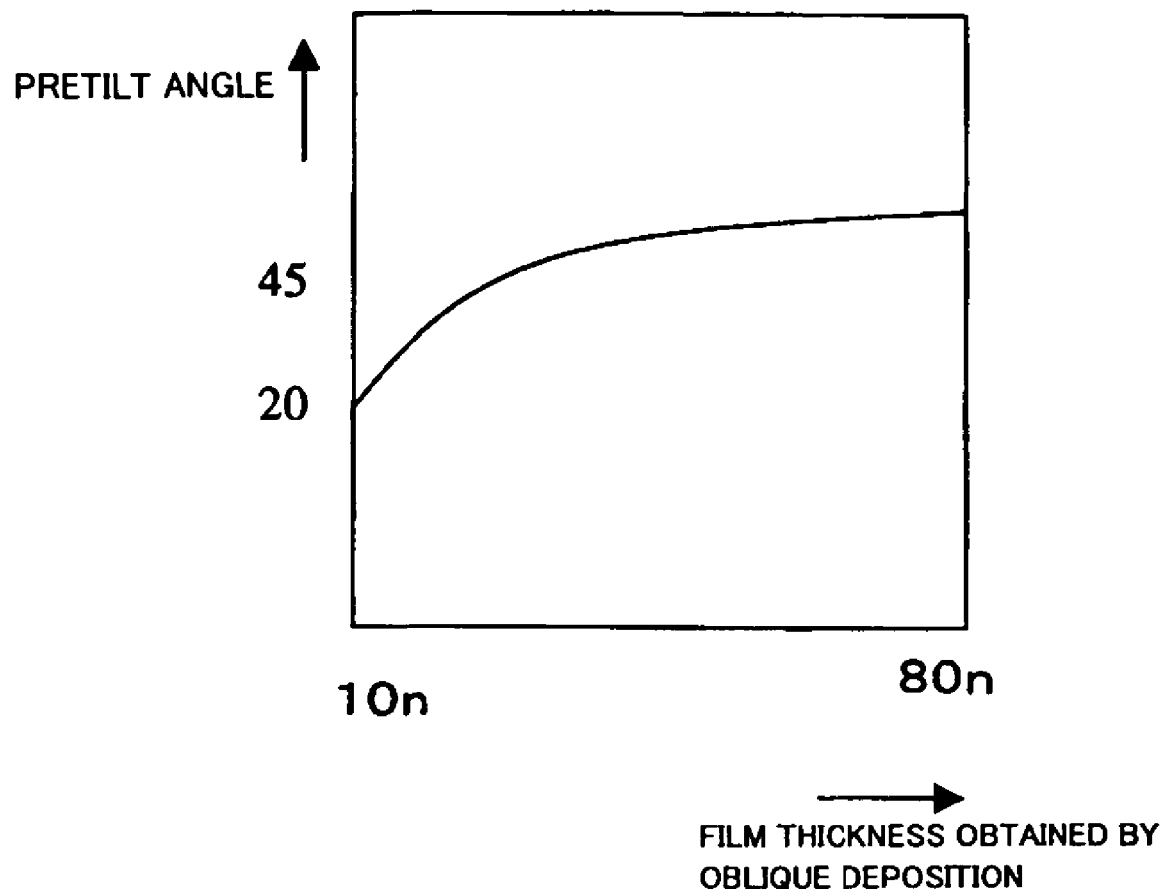
FIG. 10 is a graph showing the relationship between oblique deposition and pretilting.

FIG. 3 is a sectional view taken along line H–H' of FIG. 2 of the liquid crystal device after an assembly process of affixing a TFT substrate, which is an active matrix substrate, and the opposing substrate to each other and filling the space between the substrates with liquid crystals. FIG. 4 shows an equivalent circuit having, for example, various elements and wires at pixels of a pixel area of the liquid crystal device of the embodiment. FIG. 5 is a sectional view showing in detail a pixel structure of the liquid crystal device shown in FIGS. 1 to 4. FIG. 6 is a flowchart of the steps of assembling the liquid crystal device. FIG. 7 is a flowchart of the steps of an alignment operation in the embodiment. FIG. 8 is a graph showing the relationship between rubbing and pretilting. FIG. 9 is a graph showing the relationship between ion beam irradiation and pretilting. FIG. 10 is a graph showing the relationship between oblique deposition and pretilting. In the figures, in order to illustrate each layer and each member with sizes that allow them to be seen, they are not drawn to scale.

As described above, liquid crystal molecules can be disposed parallel to alignment layers disposed on surfaces of liquid crystal substrates. In addition, the long axes of the liquid crystal molecules can be set in the same predetermined direction by, for example, rubbing the respective alignment layers. Hereunder, the term alignment operation also refers to orienting the liquid crystal molecules in the same direction. Hereinafter, the orientating of the liquid crystal molecules may be called isotropic operation. The isotropic operation may make use of a method using ion beams or oblique deposition in addition to rubbing.

For example, rubbing the alignment layers on the respective surfaces of the liquid crystal substrates causes the liquid crystal molecules to be disposed parallel with the respective alignment layers, so that the long axes of the liquid crystal molecules are aligned in predetermined directions.

In the embodiment, an alignment operation is performed at areas of the alignment layers that are disposed in correspondence with pixel electrode edges on the TFT substrate affected by transverse electric field and that are reverse tilt areas if they are not in accordance with the embodiment when the space between the substrates is filled with liquid crystals (such areas are hereinafter referred to as reverse tilt areas for convenience of explanation) in order that the pretilt angles in the reverse tilt areas are greater than those in the other areas (such areas are hereinafter referred to as ordinary tilt areas for convenience of explanation). The alignment operation reduces the effects of the transverse electric field, so that actual reverse tilt portions are narrowed.

The entire structure of the liquid crystal device of the embodiment will be described with reference to FIGS. 2 to 4.

As shown in FIGS. 2 and 3, the liquid crystal device can include a TFT substrate 10, such as a quartz substrate, a glass substrate, or a silicon substrate; an opposing substrate 20, such as a glass substrate or a quartz substrate, opposing the TFT substrate 10; and liquid crystals 50 in the space between the TFT substrate 10 and the opposing substrate 20. The TFT substrate 10 and the opposing substrate 20 are affixed to each other by a sealant 41.

For example, pixel electrodes (ITOs) 9a forming pixels are disposed in a matrix on the TFT substrate 10. An opposing electrode (ITO) 21 is disposed on the entire surface of the opposing substrate 20. An alignment layer 16 subjected to an alignment operation is disposed on the pixel electrodes 9a on the TFT substrate 10. An alignment layer 22 subjected to an alignment operation is disposed on the opposing electrode 21 over the entire surface of the opposing substrate 20. The alignment layers 16 and 22 are, for example, transparent organic films, such as polyimide films, or inorganic films. In the embodiment, the alignment operation performed at the reverse tilt areas and the alignment operation performed at the ordinary tilt areas of the alignment layer 16 are different.

FIG. 4 shows an equivalent circuit having elements disposed on the TFT substrate 10 and forming the pixels. As shown in FIG. 4, at pixel areas, scanning lines 3a and data lines 6a are laid out so as to cross each other, and the pixel electrodes 9a are disposed in a matrix at areas partitioned by the scanning lines 3a and the data lines 6a. TFTs 30 are disposed in correspondence with the intersections of the scanning lines 3a and the data lines 6a, and are connected to the pixel electrodes 9a.

The TFTs 30 are turned on by ON signals from the scanning lines 3a, so that image signals supplied to the data lines 6a are supplied to the pixel electrodes 9a. Voltage between the pixel electrodes 9a and the opposing electrode 21 on the opposing substrate 20 is applied to the liquid crystals 50.

Storage capacitors 70 can be disposed parallel with the pixel electrodes 9a, and allow the voltage of the pixel electrodes 9a to be held for a length of time that is, for example, 100 times longer than the length of time that source voltage is applied. The storage capacitors 70 make it possible to improve voltage holding property, and, thus, to display an image with high contrast.

The pixel electrodes 9a are disposed in a matrix on the TFT substrate 10, and the data lines 6a and the scanning lines 3a are disposed along the vertical and horizontal boundaries of the pixel electrodes 9a. As described in greater detail below, the data lines 6a have layered structures including, for example, aluminum films, and the scanning lines 3a are formed of, for example, electrically conductive polysilicon films. The scanning lines 3a oppose a channel area 1a' described below. More specifically, in the image switching TFTs 30, gate electrodes, connected to the scanning lines 3a, oppose the channel area 1a' at the intersections of the scanning lines 3a and the data lines 6a.

FIG. 1 shows some of the pixel electrodes 9a disposed in a matrix. As described above, the data lines 6a and the scanning lines 3a are disposed along the vertical and horizontal boundaries of the pixel electrodes 9a. In FIG. 1, + signs denote the pixel electrodes to which drive voltage of positive polarity is applied in line reverse driving at a predetermined timing, whereas − signs denote the pixel electrodes to which drive voltage of negative polarity is applied in the line reverse driving at a predetermined timing.

Ranges E indicated by arrows in FIG. 1 are affected by the transverse electric field in the line reverse driving methods. Areas that are disposed in the ranges E affected by the transverse electric field and that become the reverse tilt areas if they are not in accordance with the embodiment due to a difference between the orientation of the long axes of the liquid crystal molecules and the orientation of the transverse electric field due to a rubbing direction or the like are indicated as areas F by arrows in FIG. 1.

In the embodiment, at least strips areas G (slanted line portions 111) disposed at ends of the respective pixel electrodes 9a in the areas F that become the reverse tilt areas by the effects of the transverse electric field in the line reverse driving method and that are disposed at one edges of the respective pixel electrodes 9a are subjected to an alignment operation so that the pretilt angles in the strip areas G are greater than the pretilt angles in the other areas. Hereunder, the areas having pretilt angles that are greater than those of the other areas are called high pretilt areas.

The pretilt angles in the entire reverse tilt areas may be set greater than the pretilt angles in the ordinary tilt areas. Light-shielding areas (non-open areas) are formed at the data lines 6a and the scanning lines 3a. Since the effects of reverse tilting at the light-shielding areas on image quality is relatively small, these areas at the data lines 6a and the scanning lines 3a do not have to be high pretilt areas.

In general, the edges of the pixel electrodes 9a may become non-open areas due to reasons other than reverse tilting. In this case, the non-open areas at the edges of the pixel electrodes 9a do not have to be high pretilt areas.

In the embodiment, the high pretilt areas are disposed at at least open areas at the pixel electrodes 9a and at areas including the edges of the pixel electrodes 9a that become the reverse tilt areas if they are not in accordance with the embodiment. It is actually desirable to form the high pretilt areas so that they slightly cover the open areas considering the formation of margins.

FIG. 5 is a schematic sectional view of the liquid crystal device, focusing on one pixel. A groove 11 can be formed in a lattice in the element substrate 10 formed of, for example, glass or quartz. A TFT 30 having an LDD (lightly doped drain) structure is disposed on the groove 11 through a first interlayer insulating film 13 and a light shielding film 12 disposed below it. The groove 11 facilitates flattening of the boundary surface between the TFT substrate and the liquid crystals 50.

In the TFT 30, a scanning line 3a, forming a gate electrode, is disposed on a semiconductor layer 1a having the channel area 1a', a source area 1d, and a drain area 1e through a gate insulating film 2. The portion of the scanning line 3a where the gate electrode is formed is wide, and the channel area 1a' is formed where the semiconductor layer 1a and the scanning line 3a oppose each other.

The respective transparent pixel electrodes 9a are disposed in a matrix on the element substrate 10, and the scanning line 3a and the data line 6a are disposed along the horizontal and vertical boundaries of the pixel electrodes 9a. The light-shielding film 12 is disposed in a lattice in correspondence with each pixel along the data lines 6a and the scanning lines 3a. The light-shielding film 12 prevents reflected light from impinging upon the channel area 1a', the source area 1d, and the drain area 1e of the TFT 30.

The light-shielding film 12 is formed of a high-melting metal, such as Ti, Cr, W, Ta, Mo, or Pb; an alloy including at least one of these metals; a metal silicide comprising at least one of these metals; a polysilicide comprising at least one of these metals; or a lamination of these.

A second interlayer insulating film 14 is disposed on the TFT 30, and a first intermediate electrically conductive layer 15 having an island shape and extending in the direction of the scanning line 3a and the data line 6a is formed on the second interlayer insulating film 14. A capacitive line 18 is disposed on the first intermediate electrically conductive layer 15 through a dielectric film 17 so as to oppose the first intermediate electrically conductive layer 15.

The first intermediate electrically conductive layer 15 operates as a pixel electrical potential capacitive electrode (lower capacitive electrode) connected to the pixel electrodes 9a and the heavily doped drain area 1e of the TFT 30. A portion of the capacitive line 18 operates as a constant electrical potential capacitive electrode.

The capacitive line 18 is a multilayer structure of an upper capacitive electrode and a light-shielding layer, opposes the first intermediate electrically conductive layer 15 through the dielectric film 17 to form a storage capacitor (storage capacitor 70 in FIG. 4), and has a light-shielding function for preventing internal reflection of light. The first intermediate electrically conductive layer 15 is disposed relatively close to the semiconductor layer, and can efficiently prevent irregular reflection of light.

The capacitive line 18 has a multilayer structure of the upper capacitive electrode (formed of, for example, electrically conductive polysilicon film) and the light-shielding layer (formed of, for example, a metal silicide film having a high-melting metal). For example, the capacitive line 18 including the light-shielding layer (formed of a silicide of any one of tungsten, molybdenum, titanium, and tantalum) and the upper capacitive electrode (formed of an N-type polysilicon). By this, the capacitive line 18 forms a built-in insulating film and operates as a constant electrical potential capacitive electrode.

The first intermediate electrically conductive layer 15 is formed of, for example, an electrically conductive polysilicon film, and operates as a pixel electrical potential capacitive electrode. The first intermediate electrically conductive layer 15 also operates as a light-absorbing layer between the capacitive line 18 disposed as a built-in light-shielding film and the TFT 30, and serves as a transit connection between the pixel electrodes 9a and the heavily doped drain area 1e of the TFT 30. Like the capacitive line 18, the first intermediate electrically conductive layer 15 may have a single layer structure or a multilayer structure comprising a metal or an alloy.

The dielectric film 17 disposed between the first intermediate electrically conductive layer 15 operating as a lower capacitive electrode and the capacitive line 18 forming an upper capacitive electrode is relatively thin, for example, approximately 5 to 200 nm, and is formed of a silicon nitride film or a silicon oxide film, such as an HTO (high temperature oxide) film and an LTO (low temperature oxide) film. From the viewpoint of increasing storage capacity, as long as the reliability of the film is ensured, the thinner the dielectric film 17, the better.

The capacitive line 18 extends from an image display area where the pixel electrodes 9a are disposed to locations surrounding the image display area, and is electrically connected to a fixed voltage source and has a fixed electric potential. The fixed voltage source may be a positive power supply or a negative power supply for applying voltage to scanning line drive circuits 63 (described below) or a data line drive circuit 61 (described below), or may be one applying voltage to the opposing electrode 21 on the opposing substrate 20. The scanning line drive circuits 63 are used for supplying scanning signals to the scanning lines 3a in order to drive the TFTs 30. The data line drive circuit 61 is used for controlling a sampling circuit that supplies image signals to the data lines 6a. Like the capacitive line 18, the light-shielding film 12 may be extended from the image display area to locations surrounding the image display area and connected to the fixed voltage source in order to prevent its voltage change from adversely affecting the TFT 30.

In order to electrically connect the data line 6a and the source area 1d, a second intermediate layer 15b is formed at the same level as the first intermediate electrically conductive layer 15. The second intermediate electrically conductive layer 15b is electrically connected to the source area 1d through a contact hole 24a passing through the second interlayer insulating film 14 and the insulating film 2.

A third interlayer insulating film 19 is disposed on the capacitive line 18, and the data line 6a is disposed on the third interlayer insulating film 19. The data line 6a is electrically connected to the source area 1d through the second intermediate electrically conductive layer 15b and a contact hole 24b passing through the third interlayer insulating film 19 and the dielectric film 17.

A fourth interlayer insulating film 25 is disposed on the third interlayer insulating film 19 and the data line 6a. The fourth interlayer insulating film 25 is planarized by polishing, such as by CMP (chemical mechanical polishing).

The pixel electrodes 9a are disposed on the data line 6a through the fourth interlayer insulating film 25. The pixel electrodes 9a are electrically connected to the first intermediate electrically conductive layer 15 by a contact hole 26b passing through the fourth interlayer insulating film 25, the third interlayer insulating film 19, and the dielectric film 17. The first intermediate electrically conductive layer 15 is electrically connected to the drain area 1e through a contact hole 26a passing through the second interlayer insulating film 14 and the insulating film 2. The alignment layer 16 formed of a polyimide polymeric resin is disposed on the pixel electrodes 9a, and is subjected to an alignment operation in a predetermined direction.

As described above, when the alignment operation is carried out, at least high pretilt areas in the reverse tilt areas have pretilt angles that are greater than the pretilt angles in the other areas.

An ON signal is supplied to the scanning line 3a (gate electrode), causing the channel area 1a' to be brought into electrical conduction. The source area 1d and the drain area 1e are connected to supply the image signal supplied to the data line 6a to the pixel electrodes 9a.

A first light-shielding film 23 is disposed on an area of the opposing substrate 20 opposing the data line 6a, the scanning line 3a, and the TFT 30 on the element substrate, that is, at a non-display area (non-open area) of each pixel. The first light-shielding film 23 prevents light from the opposing substrate 20 from impinging upon the drain area 1e, the source area 1d, the channel area 1a' of the TFT 30. The opposing electrode (common electrode) 21 is disposed on the first light-shielding film 23 over the entire surface of the substrate 20. The alignment layer 22 formed of polyimide polymeric resin is disposed on the opposing electrode 21, and is subjected to an alignment operation in a predetermined direction.

The space between the element substrate 10 and the opposing substrate 20 is filled with the liquid crystals 50. The TFT 30 writes the image signal supplied from the data line 6a onto the pixel electrodes 9a at a predetermined timing. In accordance with the difference between the electrical potential of the pixel electrodes 9a on which the image signal is written and the electrical potential of the opposing electrode 21, the orientations and order of the molecules of the liquid crystals 50 are varied in order to modulate light and produce a difference in shading.

As shown in FIGS. 2 and 3, a light-shielding film 42 serving as a frame for the display area is disposed on the opposing substrate 20. The light-shielding film 42 is formed of a light-shielding material that is the same as or different from that of the light-shielding film 23.

The sealant 41 for sealing in the liquid crystals is disposed in an area at the outer side of the light-shielding film 42 between the element substrate 10 and the opposing substrate 20. The sealant 41 is disposed substantially following the ends of the opposing substrate 20, and affixes the element substrate 10 and the opposing substrate 20 together. The sealant 41 is not formed at a portion of one side of the element substrate 10. This portion corresponds to a liquid crystal injection opening 78 for injecting the liquid crystals 50 in the space between the affixed element substrate 10 and the opposing substrate 20. After injecting the liquid crystals from the liquid crystal injection opening 78, the liquid crystal injection opening 78 is sealed by a sealant 79.

The data line drive circuit 61 and mounting terminals 62 are disposed at the outer side of the sealant 41 along one side of the element substrate 10. The scanning line drive circuits 63 are disposed along two sides adjacent to the one side along which the circuit 61 and the terminals 62 are disposed. A plurality of wires 64 for connecting the scanning line drive circuits 63 on both sides of the image display area are disposed on the remaining one side of the element substrate 10. A conductive material 65 for electrically connecting the element substrate 10 and the opposing substrate 20 is disposed on at least one location of each corner of the opposing substrate 20.

The alignment step in the embodiment will be described with reference to FIGS. 6 and 7. FIG. 6 illustrates the steps of assembling a panel. FIG. 7 illustrates the alignment step in FIG. 6.

For simplifying the explanation, the high pretilt areas are defined as the entire reverse tilt areas.

In the assembly process, first, in Steps S1 and S5 in FIG. 6, the element substrate 10 having the pixel electrodes 9a disposed thereon and the opposing substrate 20 having the opposing electrode 21 disposed thereon are provided. Next, by performing Steps S2, S6, and S7, alignment operations are performed with respect to the element substrate 10 and the opposing substrate 20.

The alignment operations may be carried out by rubbing, an ion beam technique, or oblique deposition. After applying an alignment material (such as polyimide) to a surface of the opposing substrate 20 in Step S6, the material is rubbed in Step S7 to form the alignment layer 22.

In the embodiment, in order to make the pretilt angles of the liquid crystal molecules in the reverse tilt areas different from the pretilt angles of the liquid crystal molecules in the ordinary tilt areas, two alignment operations are carried out with respect to the element substrate 10 by three alignment methods. In this case, as shown in Table 1 below, it is possible that, after performing a first alignment operation on the entire alignment layer by any one of the three alignment methods, a second alignment operation is carried out at the reverse tilt areas or the ordinary tilt areas by the appropriate alignment method. These are two ways of carrying out the alignment operations. It is also possible that, after performing a first alignment operation at the reverse tilt areas or the ordinary tilt areas on the alignment layer by any one of the three alignment methods, a second alignment operation is performed at the areas at which the first alignment operation is not performed by the appropriate alignment method. These are two other ways of carrying out the alignment operations.

In the embodiment, it is possible to use three alignment methods, that is, rubbing, a method using ion beams, and oblique deposition, in the first operations and the second operations, and to carry out the alignment operations in the aforementioned four ways so that the areas at which the first alignment operations are performed are different from those on which the second alignment operations are performed. Therefore, simple calculation yields 3×3×4=36 types of alignment operations.

In the embodiment, oblique deposition is carried out in the first alignment operations, and any one of rubbing, technique using ion beams, and oblique deposition is carried out in the second alignment operations. In addition, the alignment operations are carried out in the above-described four ways, so that the areas at which the first alignment operations are carried out are different from the areas at which the second alignment operations are carried out, respectively. Consequently, in the embodiment, simple calculation yields 3×4=12 types of alignment operations. However, it is actually difficult to use rubbing as an alignment method after using oblique deposition as an alignment method. As a result, a total of 8 types of alignment operations are possible.

TABLE 1

|  | Alignment Area | Masking Method |
| --- | --- | --- |
| First Alignment Operation | Entire Surface | No Masking |
| Second Alignment Operation | Ordinary Tilt Areas | Reverse Tilt Area Masking |
| First Alignment Operation | Entire Surface | No Masking |
| Second Alignment Operation | Reverse Tilt Area | Ordinary Tilt Areas Masking |
| First Alignment Operation | Ordinary Tilt Areas | Reverse Tilt Area Masking |
| Second Alignment Operation | Reverse Tilt Area | Ordinary Tilt Areas Masking |
| First Alignment Operation | Reverse Tilt Area | Ordinary Tilt Areas Masking |
| Second Alignment Operation | Ordinary Tilt Areas | Reverse Tilt Area Masking |

FIG. 7 shows a flowchart considering areas at which the alignment methods are carried out in the first and second alignment operations. The first and second areas in FIG. 7 are ordinary tilt areas and reverse tilt areas or reverse tilt areas and ordinary tilt areas.

In Step S21 of FIG. 7, a determination is made as to whether or not an alignment method is to be performed on the entire surface of the alignment layer 16. If it is determined that the alignment method is not to be performed on the entire surface of the alignment layer 16, a mask is disposed on the second areas in Step S22, and the alignment method is performed at the first areas in Step S23. Accordingly, the alignment operation that produces predetermined pretilt angles in the first areas is carried out. Next, the mask on the second areas is removed in Step S24, after which a mask is disposed on the first areas in Step S25.

In Step S26, an alignment method is performed at the second areas. Accordingly, the alignment operation that produces pretilt angles in the second areas that are different from those in the first areas is carried out.

Lastly, the mask on the first areas is removed in Step S27.

In contrast, if a determination is made that an alignment method is to be performed on the entire surface of the alignment layer 16, the alignment method is performed on the entire surface of the alignment layer 16 in Step S28. Next, a mask is disposed on the first areas in Step S25, after which an alignment method is performed at the second areas in Step S26.

In other words, in this case, pretilt angles are formed in the first areas by only Step S28. Pretilt angles are formed in the second areas by Steps S26 and S28. In this way, the alignment operation for producing in the second areas pretilt angles that are different from those in the first areas is carried out. Lastly, the mask on the first areas is removed in Step S27.

Here, for example, the case in which rubbing is used as the alignment method in the first alignment operation and a method using ion beams is used as the alignment method in the second alignment operation, the reverse tilt areas are defined as the first areas, and the alignment operation is performed on the entire surface will be described.

In this case, since the alignment operation is performed on the entire surface, first, in Step S28, an alignment layer for achieving a high pretilt angle is formed on the element substrate 10 by, for example, spin coating or printing. Next, the surface of the element substrate 10 is rubbed by a rubbing roller having a rubbing cloth, formed of, for example, rayon, wound thereupon. The rubbing condition is set so that a pretilt angle of, for example, 10 degrees is formed.

FIG. 8 shows the relationship between rubbing strength and pretilt angle, with the horizontal axis representing the rubbing strength and the vertical axis representing the pretilt angle. As shown in FIG. 8, reducing the rubbing strength makes it possible to perform rubbing for forming a relatively large pretilt angle.

In Step S25, the reverse tilt areas, which are the first areas in this case, is masked by resist or the like. In Step S26, only the ordinary tilt areas are irradiated with ion beams, such as argon (Ar) ions, at an angle of approximately 60 degrees from a direction perpendicular to the substrate 10 for a certain period of time.

FIG. 9 shows the relationship between the amount of irradiation with ion beams (IB) and pretilt angle, with the horizontal axis representing the irradiation amount and the vertical axis representing the pretilt angle. As shown in FIG. 9, increasing the amount of irradiation with the ion beams makes it possible to perform an alignment operation for achieving a relatively small pretilt angle. Therefore, the ordinary tilt areas can have pretilt angles of, for example, approximately 3 to 4 degrees. Lastly, the resist on the reverse tilt areas is removed in Step S27.

In this way, in the embodiment, the pretilt angles in the ordinary tilt areas are set at approximately 3 to 4 degrees, and the pretilt angles in the reverse tilt areas are set at high values of approximately 10 degrees.

FIG. 10 shows the relationship between film thickness achieved by oblique deposition and pretilt angle, with the horizontal axis representing the film thickness and the vertical axis representing the pretilt angle. As shown in FIG. 10, forming a thick film by the oblique deposition makes it possible to perform an alignment operation for achieving a relatively large pretilt angle.

As is clear from FIGS. 8 to 10, it is possible to perform alignment operations for achieving predetermined pretilt angles by carrying out rubbing, ion beam processing, and oblique deposition in combination and properly setting processing conditions.

Here, for example, the case in which oblique deposition is used as the alignment methods in both the first and second alignment operations, the reverse tilt areas are defined as the first areas, and an alignment operation is performed on the entire surface will be described.

When the alignment operation is performed on the entire surface, first, in Step S28, an alignment layer is formed on the entire surface of the element substrate 10 by the oblique deposition. In other words, SiO is deposited to approximately a few tens of nanometers at an angle of 80 degrees from a direction perpendicular to the substrate, so that the alignment layer having a pretilt angle of 20 to 30 degrees by the alignment operation is formed on the entire surface of the element substrate 10.

In Step S25, the reverse tilt areas, which are the first areas, is masked by, for example, resist. Next, in Step S26, the second oblique deposition is performed at only the ordinary tilt areas. For example, SiO is deposited to a thickness of approximately a few tens of nanometers at an angle of approximately 60 degrees from a direction perpendicular to the substrate 10. As is clear from FIG. 10, the pretilt angle produced by the second oblique deposition is a relatively small value of, for example, approximately 10 degrees. Lastly, the resist on the reverse tilt areas is removed in Step S27.

Accordingly, the alignment operations which are performed so that the pretilt angles in the ordinary tilt areas are small values of approximately 10 degrees, and so that the pretilt angles in the reverse tilt areas are large values of approximately 20 to 30 degrees are carried out.

In the steps of assembling the panel in FIG. 6, after the alignment step, the sealant 41 and the conductive materials 65 (see FIG. 2) are disposed on the element substrate 10 in Step S3.

After disposing the sealant 41, the element substrate 10 and the opposing substrate 20 are affixed to each other in Step S10. By contact bonding them while performing the alignment operations in Step S11, the sealant 41 is hardened. Lastly, the space between the element substrate 10 and the opposing substrate 20 is filled with liquid crystals from a gap in the sealant 41, and the gap is sealed to seal in the liquid crystals in Step S12.

The first light-shielding film 23 on the opposing substrate 20 determines the open area of each pixel. The first light-shielding film 23 is formed so that, when reverse tilting occurs at each pixel electrode 9a, each actual reverse tilt portion is a non-open area. Therefore, each open area is narrower than its corresponding pixel electrode 9a in correspondence with its actual reverse tilt portion. In the embodiment, the pretilt angles in the high pretilt areas in the reverse tilt areas are greater than those in the other areas, and are values that do not allow reverse tilting to occur easily. Therefore, reverse tilting occurs only at a portion considerably affected by transverse electric field, so that the area of each pixel electrode 9a that its corresponding actually reverse tilt portion occupies can be sufficiently small. Therefore, the first light-shielding film 23 is narrowed, so that each open area is widened.

As mentioned above, there are 36 types of alignment operations when alignment methods are used in two alignment operations for forming the high pretilt areas and the other areas. For example, it is possible to perform rubbing in both the first and second alignment operations, to set the reverse tilt areas as the first areas, and to perform the alignment operation on the entire surface.

In this case, in Step S28, an alignment layer for achieving a high pretilt angle is formed on the element substrate 10 by, for example, spin coating or printing. Next, the surface of the element substrate 10 is rubbed by a rubbing roller having a rubbing cloth, formed of, for example, rayon, wound thereupon. In this case, since rubbing is also performed in the second alignment operation, the rubbing condition is set so that the rubbing strength is relatively weak. Accordingly, the alignment operation for achieving a relatively high pretilt angle is carried out over the entire alignment layer 16.

Next, the reverse tilt areas are masked by, for example, resist, and only the ordinary tilt areas are rubbed. Accordingly, the ordinary tilt areas are strongly rubbed to perform the alignment operation for achieving small pretilt angles. Therefore, the alignment operation for making the pretilt angles in the ordinary tilt areas small and the pretilt angles in the reverse tilt areas large is carried out.

Alignment operations using a technique using ion beams and oblique deposition may be carried out. FIG. 10 shows the relationship between film thickness achieved by oblique deposition and pretilt angle, with the horizontal axis representing the film thickness and the vertical axis representing the pretilt angle. As shown in FIG. 10, forming a thick film by the oblique deposition makes it possible to perform an alignment operation for achieving a relatively large pretilt angle.

Here, for example, the technique using ion beams is used in the first alignment operation and the oblique deposition is used in the second alignment operation, the ordinary tilt areas are defined as the first areas, and the alignment operation is performed on the entire surface. In this case, in Step S28, first, an alignment material for orienting the ion beams is disposed on the element substrate 10. Examples of the alignment material are not only organic films, such as polyimide films, but also inorganic films, such as $SiO_2$ films. Next, an alignment layer formed on the element substrate 10 is irradiated with the ion beams, such as Ar ions, at an angle of 60 degrees from a direction perpendicular to the substrate 10 for a certain period of time. By this, the alignment operation for achieving a pretilt angle of approximately 3 to 4 degrees over the entire surface of the alignment layer is performed.

Next, the ordinary tilt areas are masked to carry out the oblique deposition. For example, SiO is deposited to approximately a few tens of nanometers at an angle of 80 degrees from a direction perpendicular to the substrate. Accordingly, the alignment operation for achieving a pretilt angle of 20 to 30 degrees in the reverse tilt areas is carried out. Consequently, even in this case, the alignment operation for achieving small pretilt angles of approximately 3 to 4 degrees in the ordinary tilt areas and large pretilt angles of approximately 20 to 30 degrees in the reverse tilt areas is carried out.

In this way, in the embodiment, since each reverse tilt area where reverse tilting can occur due to the effects of transverse electric field in a line reverse driving method is such that at least each open area has a pretilt angle that does not easily allow reverse tilting, each actual reverse tilt portion is narrowed, so that aperture ratio is increased.

Although, in the embodiment, two alignment operations are carried out so that the pretilt angles in the reverse tilt areas are different from the pretilt angles in other areas, the number of alignment operations can be increased in order that the tilt angles in the reverse tilt areas change gradually.

Although, in the embodiment, the liquid crystal device has pixel electrodes that are planarized, it is obvious that the liquid crystal device may have pixel electrodes that are not planarized.

Although, in the embodiment, oblique deposition is used in the second alignment operation, the technique using ion beams may be used in the second alignment operation.

In the embodiment, the example in which oblique deposition is performed on the entire surface of the element substrate 10 in the first alignment operation is described. However, for example, a first alignment layer may be formed by oblique deposition on the element substrate 10 in correspondence with ones of the reverse tilt areas and the ordinary tilt areas, and a second alignment layer may be formed by oblique deposition in correspondence with the locations of the others of the reverse tilt areas and the ordinary tile areas in the second alignment operation. In addition, for example, with an alignment material, such as an inorganic film, being disposed in correspondence with the locations of ones of the reverse tilt areas and the ordinary tilt areas, an alignment layer is only formed in correspondence with the locations of the others of the reverse tilt areas and the ordinary tilt areas by oblique deposition in the first alignment operation, and the previously disposed alignment material is irradiated with ion beams in the second alignment operation.

In this way, in the embodiment, since each reverse tilt area where reverse tilting can occur due to the effects of transverse electric field in a line reverse driving method is such that at least each open area has a pretilt angle that does not easily allow reverse tilting, each actual reverse tilt portion is narrowed, so that aperture ratio is increased.

Although, in the embodiment, two alignment operations are carried out so that the pretilt angles in the reverse tilt areas are different from the pretilt angles in other areas, the number of alignment operations can be increased in order that the tilt angles in the reverse tilt areas change gradually.

Although, in the embodiment, the liquid crystal device has pixel electrodes that are planarized, it is obvious that the liquid crystal device may have pixel electrodes that are not planarized.

Although, in the embodiment, the liquid crystal device is described as being a line reverse driving liquid crystal device, it may obviously be a dot reverse driving liquid crystal device.

Next, the entire structure, in particular, the optical structure of an embodiment of a projection color display apparatus, which is an example of an electronic apparatus, using a plurality of the liquid crystal devices described in detail above as light valves will be described. Here, FIG. 11 illustrates a projection color display apparatus.

Figure 11:
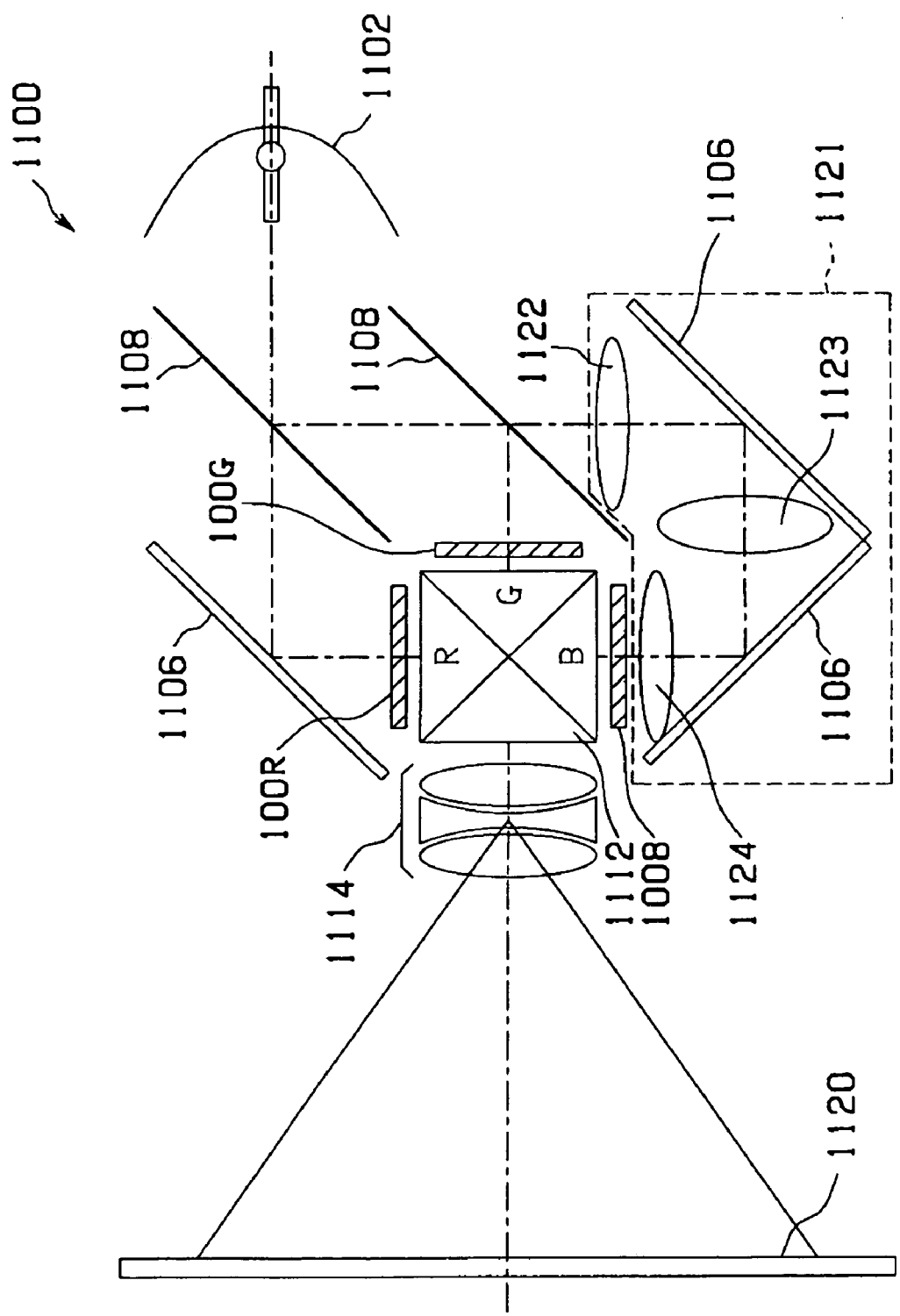
FIG. 11 shows a projection color display apparatus.
Figure 12:
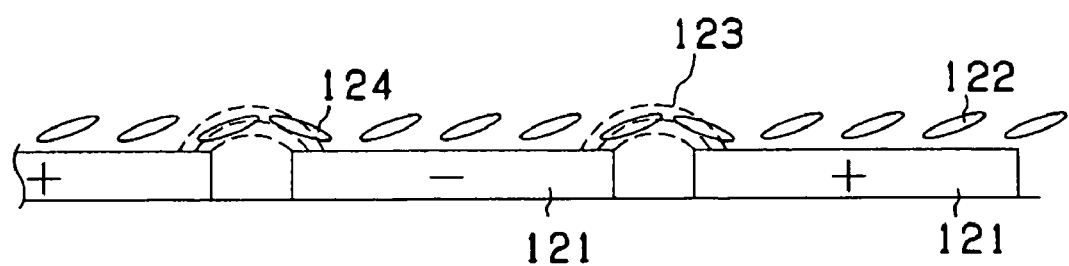
FIG. 12 is a schematic view showing the effects of pretilting of liquid crystal molecules and transverse electric field when a voltage is not applied.

In FIG. 11, a liquid crystal projector 1100, which is an example of the projection color display apparatus of the embodiment, uses three liquid crystal modules used as light valves 100R, 100G, and 100B. The liquid crystal modules include liquid crystal devices having drive circuits disposed on a TFT array substrate. In the liquid crystal projector 1100, projection light emitted from a lamp unit 1102, which is a white light source such as a metal halide lamp, is divided into light components R, G, and B corresponding to the three primary colors R, G, B by three mirrors 1106 and two dichroic mirrors 1108. The light components R, G, and B are guided to the light valves 100R, 100G, and 100B, respectively. Here, in order to prevent loss of, in particular, blue light due to its long optical path, the blue light is guided through a relay lens system 1121 having an incident lens 1122, a relay lens 1123, and an exiting lens 1124. The light components corresponding to the three primary colors and modulated by the respective light valves 100R, 100G, and 100B are synthesized by a dichroic prism 1112. Thereafter, the synthesized light component is projected as a color image onto a screen 1120 through a projection lens 1114.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A liquid crystal device, comprising:
    a first substrate and a second substrate opposing each other;
    a plurality of pixel electrodes disposed on the first substrate in a matrix, drive voltages having opposite polarities with respect to a reference voltage being applied to pixels that are adjacent to each other;
    a common electrode disposed on the second substrate;
    an electro-optical substance disposed between the first substrate and the second substrate;
    a second alignment layer disposed on the second substrate and subjected to a uniform alignment operation;
    a first alignment layer on the first substrate, the first alignment layer including strip areas, each strip area being disposed adjacent a first edge of its corresponding pixel electrode and being an area where the electro-optical substance is affected by an electric field produced between the adjacent pixel electrodes by the drive voltages having opposite polarities, the first alignment layer having pretilt angles in the strip areas that are greater than pretilt angles in other areas so that the pretilt angles in the strip areas do not allow reverse tilting to occur in aperture areas.

2. The liquid crystal device according to claim 1, the alignment material being deposited while being subjected to the alignment operation.

3. The liquid crystal device according to claim 1, the pixel electrodes being planarized.

4. A liciuid crystal device, comprising:
    a first substrate and a second substrate opposing each other;
    a plurality of pixel electrodes disposed on the first substrate in a matrix, drive voltages having opposite polarities with respect to a reference voltage being applied to pixels that are adjacent to each other;
    a common electrode disposed on the second substrate;
    an electrode-optical substance disposed between the first substrate and the second substrate:
    a second alignment layer disposed on the second substrate and subjected to uniform alignment operation;
    a first alignment layer on the first substrate, the first alignment layer including strip areas, each strip area being disposed adjacent a first edge of its corresponding pixel electrode and being an area where the electro-optical substance is affected by an electric field produced between the adjacent pixel electrodes by the drive voltages having opposite polarities, the first alignment layer having pretilt angles in the strip areas that are greater than pretilt angles in other areas so that the pretilt angles in the strip do not allow reverse tilting to occur in aperture areas; and
    the first edge of each pixel electrode near which its corresponding strip area is disposed, an angle between a pretilt direction of the electro-optical substance and a direction of transverse electric field is greatest.

5. An electronic apparatus comprising the liquid crystal device of claim 1.

* * * * *